United States Patent
Chan et al.

[11] Patent Number: 6,152,191
[45] Date of Patent: Nov. 28, 2000

[54] APPARATUS AND METHOD FOR CONTROLLING AND PREVENTION OF VENTING OF GASEOUS FUEL TO ATMOSPHERE FROM A VEHICLE TANK AT COMPLETION OF A FUELLING PROCESS

[75] Inventors: Anthony Wai Pang Chan, North York; Ralph Rackham, Toronto, both of Canada

[73] Assignee: Fuelmaker Corporation, Canada

[21] Appl. No.: 09/285,888

[22] Filed: Apr. 7, 1999

[51] Int. Cl.[7] .................................................. B67D 5/00
[52] U.S. Cl. .................................................. 141/18; 141/197
[58] Field of Search ............... 141/2–4, 18, 21, 141/197

[56] References Cited

U.S. PATENT DOCUMENTS

| | | |
|---|---|---|
| 5,549,142 | 8/1996 | Beale .................................. 141/18 |
| 5,687,776 | 11/1997 | Forgash et al. ..................... 141/18 |
| 5,954,101 | 9/1999 | Drube et al. ....................... 141/18 |

*Primary Examiner*—J. Casimer Jacyna
*Attorney, Agent, or Firm*—David J. French

[57] ABSTRACT

In a gaseous fuelling system for motor vehicles, the residual gas in the fill lines is depressurized in a controlled manner to prevent gas "blow back" from the vehicle tank. Methods for blow back detection and prevention in direct and indirect fill procedures are provided.

18 Claims, 4 Drawing Sheets

APPARATUS AND METHOD FOR CONTROLLING AND PREVENTION OF VENTING OF GASEOUS FUEL TO ATMOSPHERE FROM A VEHICLE TANK AT COMPLETION OF A FUELLING PROCESS

FIELD OF THE INVENTION

This invention relates to valve control apparatus for depressurizing lines filled with high pressure gas. In particular, it relates to connector lines for delivering gaseous-fuel under high pressure to vehicles using compressed gas as a fuel. Specifically, the invention relates to the controlled release of pressure in such connector lines.

BACKGROUND TO THE INVENTION

In the fuelling of gas powered vehicles with compressed fuel gas, typically natural gas or hydrogen, a filling hose is connected to the on-vehicle gas reservoir. To cause the vehicle to receive and store fuel gas under high pressure, the filling hose and connector lines between the pressurized gas source, typically a compressor or reservoir, and vehicle inlet must contain gas under high pressure. When the vehicle tank is full, this high pressure line must be disconnected from the vehicle.

Such lines normally terminate in vehicle connectors. On the vehicle, a one-way valve prevents back-flow of gas from the vehicle into the connecting line, once this disconnection occurs. This one-way valve only closes when the pressure in the connecting line falls below the pressure in the vehicle tank. It is typically difficult to effect a disconnection while the connecting lines are filled with highly pressurized gas. A release of pressure is, therefore, necessary to permit disconnection.

The gas in the connecting line could be vented to the atmosphere. However, for environmental reasons, it is not desirable to vent fuel gas to the atmosphere. To release the pressure in the connecting lines, it is known to divert the high pressure gas to a secure storage reservoir, lowering the pressure of gas within the connecting lines. This "blow-down" operation thereby facilitates disconnecting the lines from the vehicle.

During the blow-down procedure, the vehicle one-way valve is supposed to prevent the reverse flow of gas from the vehicle tank back into the connecting lines. If this one-way valve fails to close completely, any attempt to depressurize the connecting line will be resisted or thwarted. Further, when the valve to the blow-down tank is opened, the tank in the vehicle will feed gas back into the connecting line and the low pressure receiving reservoir or blow-down tank will become flooded with high pressure gas. This renders it inoperative as a low pressure reservoir.

This invention relates to a system for diverting high pressure gas in a line to a lower pressure storage reservoir,—a "blow-down" operation—only under controlled conditions. In particular, the invention addresses the malfunction of one-way valves that will cause excess gas to enter the lines that are being depressurized.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

In one aspect, the invention relates to a gas-blow down system comprising:

(1) a first gas reservoir containing gas under high pressure;
(2) a second reservoir containing gas at a lower pressure;
(3) an inter-reservoir conduit extending between the first and second reservoir for conveying gas there between;
(4) an inter-reservoir control valve in the conduit for permitting gas to flow from the first to the second reservoir under controlled conditions, including valve means with the control valve for closing-off the flow of gas therethrough in response to a valve signal;
(5) a throttling orifice positioned in the conduit for limiting the rate of flow of gas through the conduit;
(6) a sensor connected to the first reservoir for providing a signal indicative of the pressure in the first reservoir; and
(7) a controller connected to the pressure sensor and the control valve, wherein the controller operates the control valve to permit gas flow through the conduit in accordance with a predetermined schedule of pressure present within the connecting line, which serves as the first reservoir, as such pressure falls over time with the discharge of gas from the connecting line into the second reservoir.

Specifically, the first reservoir corresponds to a pressurized connecting line for fuelling a vehicle, preferably filled with fuel gas under pressure. And the second, receiving reservoir is a blow-down tank that is initially, substantially evacuated of gas by prior cycles of the system. As the blow-down tank has a substantially larger volume than the connecting line, it is able to receive a substantial portion of gas in the connecting line without incurring a significant increase in pressure. This capacity allows the pressure in the connecting line to be reduced without venting gas to the atmosphere.

As an alternate variant, the blow-down tank can have a safety release valve which evacuates gas to the atmosphere through a flow sensor. If the blow-down tank is excessively pressurized, as by an undesired blow-back of fuel gas from the vehicle, the flow sensor at the safety release valve can provide a signal to shut down the inter-reservoir control valve. This procedure prevents the continuous release of gas through the blow-down tank safety valve.

The blow-down tank is evacuated for recycling by connection through an evacuation conduit having a one-way valve that connects to an evacuation means. Typically the evacuation system may be the upstream side of a compressor. The in-feed supply line to the compressor in such case preferably includes a controlled in-feed valve that isolates the low pressure supply line from the compressor until the blow-down tank is evacuated. With this in-feed valve and the inter-reservoir valve both closed, the compressor can evacuate the blow-down tank for further blow-down cycles.

If the pressure curve does not follow a predetermined curve during the blow-down stage, the controller will close the inter-reservoir valve. After a time delay, the controller may re-attempt to effect blow-down. If the interruption of the cycle has remedied the malfunction that was causing the nonstandard, aberrant pressure curve, then the blow-down process can proceed to conclusion. If a nonacceptable pressure drop curve re-occurs, the blow-down operation may be suspended again by the controller.

With this control system in operation, the receiving reservoir can be protected from becoming flooded with excess back-flowing gas that may otherwise enter the second reservoir.

The foregoing summarizes the principal features of the invention and some of its optional aspects. The invention may be further understood by the description of the preferred embodiments, in conjunction with the drawings, which now follow.

DESCRIPTION OF THE PREFERRED EMBODIMENT

Figure 1:
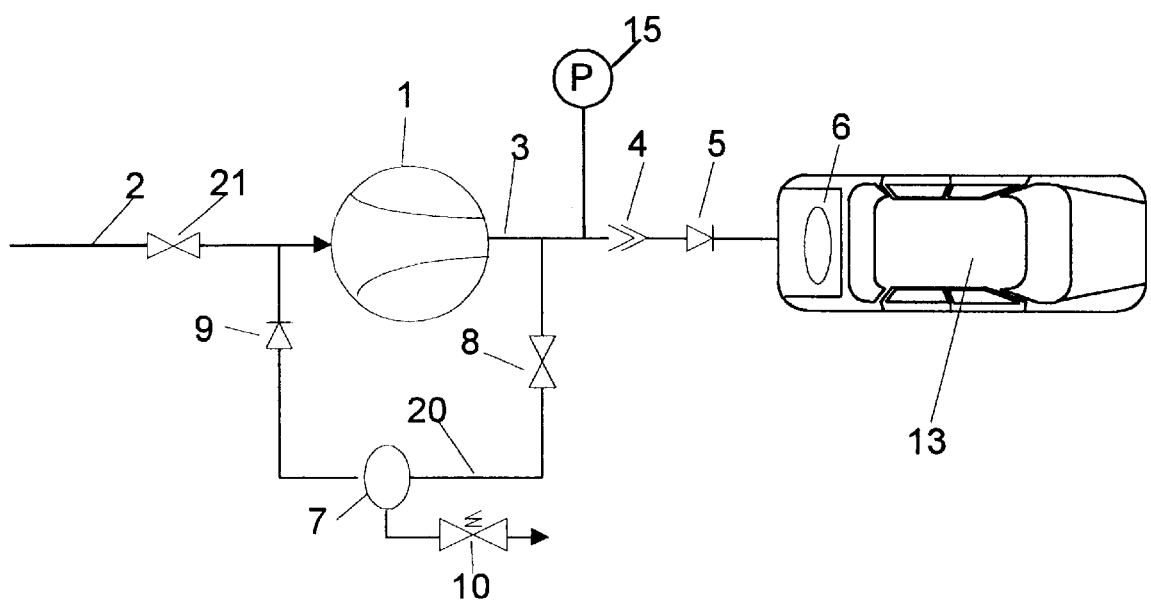
FIG. 1 is a schematic view of a prior art system wherein gas is pressurized for direct delivery to a vehicle fuel tank.

In FIG. 1 a motor vehicle 13 has a tank 6 that receives compressed gas from a connecting line 3. A gas compression system based on a compressor 1 receives gas from a low pressure gas supply line 2 on its upstream side through inlet valve 21; and provides gas to the high pressure connecting line or fill hose 3 on its downstream side. The compression system includes a pressure relief conduit 20, blow-down valve 8, a receiving (blow-down) tank 7 and a nonreturn valve 9 to connect the receiving tank 7 to the compressor inlet. The controlled inlet valve 21 allows the compressor 1 to evacuate the blow-down tank 7 in isolation from the supply line 2.

The compression system connects to the vehicle tank 6 through the connecting line 3 and a vehicle connection coupling 4. Between the coupling 4 and the tank 6 is a vehicle non-return valve 5.

Direct Fill Application

In filling a vehicle tank 6 directly from a compressor 1, the existing prior art process entails compressing gaseous fuel from a low pressure at the gas supply side to a high pressure at the vehicle tank 6. The ratio of the low pressure to the high pressure is in the order of 200 to 250. The tank-filling process may take one to several hours and is completed when pressure sensor 15 senses a maximum allowed pressure at the vehicle tank. At this moment the compressor 1 is stopped by control means (not shown), and the connecting line 3 is still filled with high-pressure gas.

A vehicle connection coupling 4 with a one-way valve (not shown) joints the line 3 to the vehicle tank 6. To disconnect the connection coupling 4, the high-pressure gas in the connecting coupling 4 must be removed. The pressure reduction in the connection coupling has been achieved in the past by two methods:

(A) a relatively small volume of high-pressure gas is vented to the atmosphere through a vent valve (not shown); or (B) a blow-down tank is employed, the tank being sized appropriately to receive the small volume of gas in the connecting line 3.

Method (B) is used extensively in residential and commercial applications.

For direct fill the tanking process usually takes hours to complete and is fully automatic and unattended. It is highly desirable to ensure that the high pressure gas present in the connecting line 3 is vented into the blow-down tank 7 at the end of the tanking process so as not to have gaseous fuel vented into the atmosphere when the coupling 4 is disconnected from the vehicle.

To prevent over-pressurizing the receiving tank 7, an emergency, spring-operated safety relief valve 10 may be employed. This relief valve 10 is set to open at a preset point (usually at a level slightly higher than the coupling disconnecting pressure) to permit emergency venting of gas to the atmosphere if the blow-down tank becomes over-pressurized.

Frequently, the vehicle non-return check valve 5 fails to close completely due to the introduction into the valve of dirt, dust or solids such as ice in the winter months. This malfunction could cause a large amount of gas from the vehicle tank 6 to pass backwards through the connecting lines 3, 20 to the blow-down reservoir 7, eventually to vent to the atmosphere through valve 10.

Indirect Fill

Figure 2:
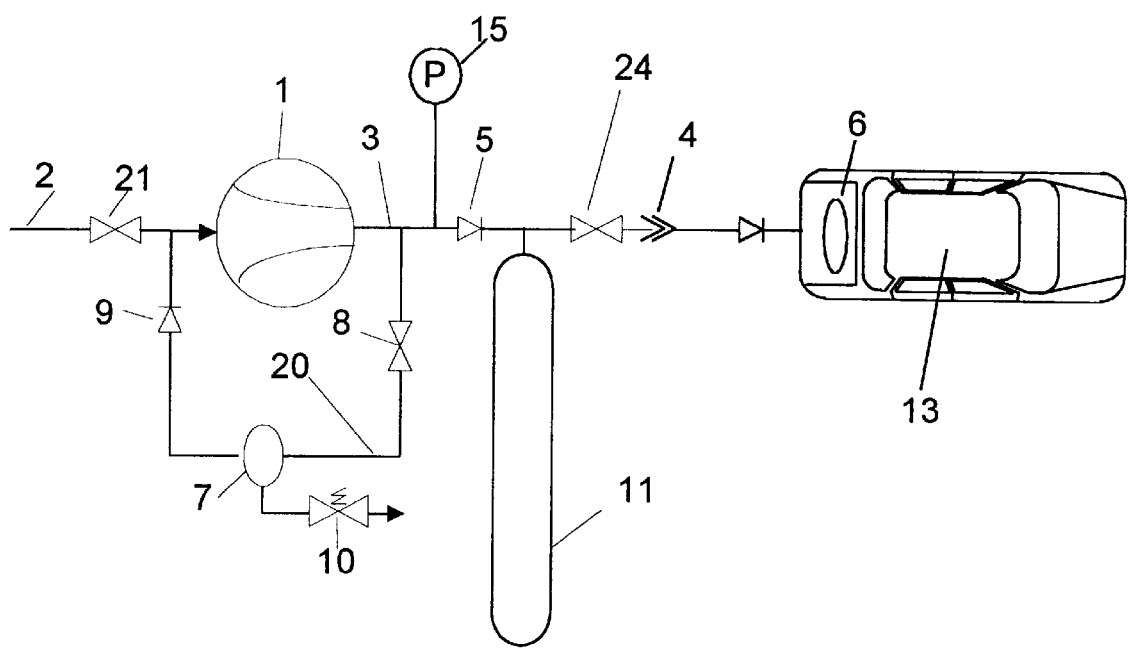
FIG. 2 is a schematic view as in FIG. 1 of a prior art system with the added presence of a ballast reservoir to increase the delivery capacity of the system to fill a vehicle fuel tank.

For indirect, prior art, fill applications (FIG. 2), the compression system is connected to a buffer tank 11, usually a bank or series of cylinders 11. The vehicle tank 6 is filled from the buffer tank 11 through the connecting coupling 4 and a tank shut-off valve 24. Non-return valve 5 is present so that at the end of the compression cycle, all high-pressure gas in the connecting line 3 and inside the compression system can be lowered to facilitate the starting of the compressor 1 in the next operating cycle. When the non-return valve 5 malfunctions due to reasons mentioned, a large volume of high-pressure gas can also be vented to the atmosphere through valve 10.

This invention, therefore, has as it object the prevention of venting large amounts of gaseous fuel to the atmosphere when the above non-return valves malfunction.

Figure 3:
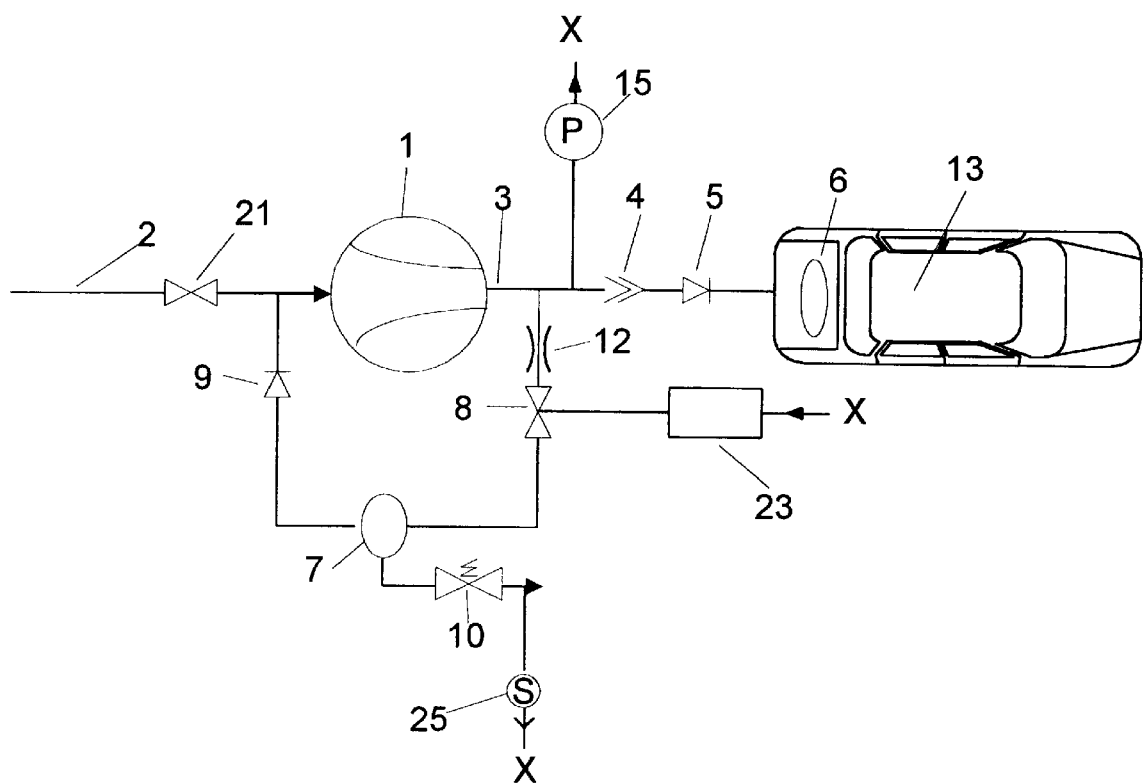
FIG. 3 shows FIG. 1 with the added features of the invention including a throttle orifice, pressure sensor and controller.
Figure 4:
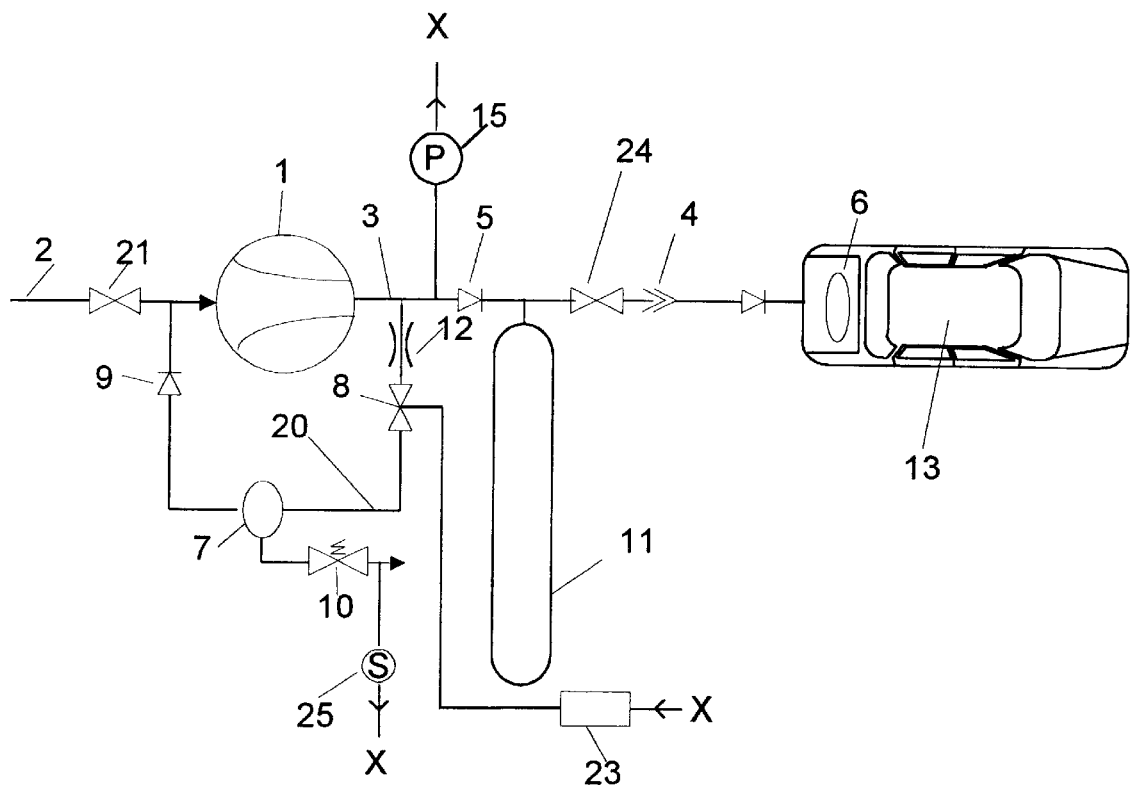
FIG. 4 shows FIG. 2 with the added features of the throttle orifice, pressure sensor and controller of the invention and also a flow sensor located at the blow-down tank safety release valve.

FIG. 3 depicts the new set-up wherein a throttling orifice 12 is placed in front of the blow-down valve 8. During the blow down process, the pressure in fill line 3 is monitored by pressure sensor "P" 15. A pressure signal X from the pressure sensor 15 is connected to a controller 23. The controller 23 evaluates the rate of decay of the pressure signal X over time. If the path of the pressure decay over time in the fill line 3 does not follow a pre-determined series of values, the valve 8 will be closed by the controller 23 to shut off the flow of gas to the reservoir 7, thereby temporarily suspending the blow-down process.

The blow-down process may be repeated after a predetermined time interval by the controller 23. The blow-down process will only be allowed to go to completion if the pressure decay curve follows the pre-determined value or path. If it fails to do so, the system will repeat the blow-down cycle until one of the following events happens:

For Direct Fill:

(A) The temporary malfunction of the non-return valve 5 is rectified (for example, the dirt or solid ice has been dislodged from the valve seat due to agitation from the pressure pulses occurring by interruption of the blow-down process); or (B) the attendant arrives and is unable to disconnect the coupling and thereafter takes appropriate remedial actions.

For Indirect Fill:

(C) The compression system 1 is re-started in order to refill the buffer tank 11; or (D) The compression system cannot restart and the attendant arrives and takes appropriate remedial action.

In FIG. 3, the pressure in line 3 is measured by pressure sensor "P" 15. Other systems may be employed to sense when an aberrant pressure decay condition exists. For example, a flow sensor may be incorporated into the throttling orifice 12 to provide a flow signal that is directed to the controller 23. If the flow rate over time is aberrant, then controller 23 will close valve 8. Indirectly, the pressure condition in the line 3 is being detected by measuring flow rate through the orifice 12.

An alternate means of detecting aberrant conditions may also be employed. Instead of using pressure sensor 15 to monitor the pressure decay on line 3, a flow sensor "S" 25 located at the downstream of side valve 10 may be employed. If there is a malfunction (e.g. the non-return valve 5 is stuck open), then high pressure gas will flow to blow-down vessel 7 and over-pressurize the tank 7, causing relief valve 10 to open. The outflow of released gas will provide a signal from the flow sensor 25 which will indicate that there is excessive flow arising from the blow-down process. This signal will allow the controller to shut off valve 8 to temporarily suspend the blow-down. While a flow sensor "S" 25 is shown in this application a second pressure sensor and flow-limiting orifice may be used instead to detect flow through valve 10 and provide an indication of an aberrant condition. Indirectly, either type of sensor will provide an indication that an over-pressure condition is persisting in the vehicle fuelling line, i.e. the first reservoir.

It has been found that by placing a throttling orifice 12 in line with the blow-down valve 8 three desirable effects are achieved. First, the amount of the natural gas venting to atmosphere through the spring loaded safety relief valve 10 is drastically limited to the marginal gas provided by the numerous, interrupted blow-down attempts once an over-pressure has developed in the tank 7. Second, a much smaller and cheaper inter-reservoir valve 8 can be used due to reduced flow volumes. And third, in the indirect fill system the pressure in the blow-down system will be maintained at a low level facilitating re-starting of the compressor.

It has been further found that the use of a semi-precious jewel such as ruby for the orifice 12 has a desirable effect. During the blow-down process, gaseous fuel, such as natural gas expands from high pressure to low pressure. The gas expansion will result in a decrease in the natural gas temperature (Joule-Thompson effect). Any moisture in the gas will solidify quickly thus tending to plug-up the orifice 12. A semi-precious orifice 12 has been found to have the desirable characteristics of resisting the tendency for the orifice 12 to become plugged by solid ice.

Thus, by employing a pressure limiting flow valve and tracking the pressure drop curve an automated response to the malfunctioning of key valves can be provided.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property are claimed as follows:

1. A pressure relief system for a reservoir of pressurized gas comprising:

(1) a first gas reservoir containing gas under high pressure;

(2) a second reservoir containing gas at a lower pressure;

(3) an inter-reservoir conduit extending between the first and second reservoir for conveying gas there between;

(4) an inter-reservoir control valve in the conduit for permitting gas to flow from the first to the second reservoir under controlled conditions, including valve means within the control valve for closing-off the flow of gas therethrough in response to a valve signal;

(5) a throttling orifice in the conduit for limiting the rate of flow of gas through the conduit;

(6) a sensor positioned to provide a signal indicative of the pressure in the first reservoir; and (7) a controller connected to the sensor and the control valve, wherein the controller provides a valve signal to operate the control valve to permit gas flow through the conduit in accordance with a predetermined pressure drop schedule of permitted pressure present over time within the first reservoir as such pressure falls over time with the discharge of gas from the first reservoir into the second reservoir.

2. A pressure relief system as in claim 1 wherein the first reservoir is a pressurized connecting line for refuelling a vehicle, said line being filled with gas under pressure, and the second, receiving reservoir is a blow-down tank of larger volume than the connecting line.

3. A pressure relief system as in claim 2 wherein the controller, when delivered a signal by the sensor that is outside the predetermined pressure drop schedule, closes the inter-reservoir control valve, and the controller, after a time delay, reopens the inter-reservoir control valve.

4. A pressure relief system as in claim 2 comprising:

(1) a compressor connected to supply gas to the connecting line from a gas supply line that is connected to the compressor at an inlet on the compressor;

(2) a blow-down tank evacuation conduit connecting the inlet on the compressor to the blow-down tank and having a one-way valve mounted therein;

(3) an in-feed control valve in the supply line to isolate the supply line from the compressor while the gas in blow-down tank is being evacuated by the compressor, whereby, upon closing the in-feed and inter-reservoir control valves and operating the compressor, gas will be evacuated from the second reservoir.

5. A system as in claim 1 further comprising:

(1) a vehicle connection coupling positioned to allow gas to flow between the first reservoir and a vehicle tank;

(2) a buffer tank coupled to the first reservoir;

(3) a shut-off valve positioned between the first buffer tank and the vehicle coupling; and (4) a one-way valve positioned in the gas flow path between the buffer tank and the throttle orifice to prevent the flow of gas from the buffer tank through the throttle orifice.

6. A system as in claim 5 wherein the throttling orifice is formed within a semi-precious jewel material.

7. A system as in claim 1 wherein the throttling orifice is formed within a semi-precious jewel material.

8. A pressure relief system for a reservoir of pressurized gas comprising:

(1) a first gas reservoir containing gas under high pressure;

(2) a second reservoir containing gas at a lower pressure;

(3) an inter-reservoir conduit extending between the first and second reservoir for conveying gas there between;

(4) an inter-reservoir control valve in the conduit for permitting gas to flow from the first to the second reservoir under controlled conditions, including valve means within the control valve for closing-off the flow of gas therethrough in response to a valve signal;

(5) a throttling orifice in the conduit for limiting the rate of flow of gas through the conduit;

(6) a sensor positioned to provide a signal indicative of the pressure in the first reservoir;

(7) a controller connected to the sensor and the control valve; and (8) a safety release valve on the second reservoir, wherein the controller operates the control valve to shut off when the gas flow occurs through the safety valve.

9. A pressure relief system for a reservoir of pressurized gas comprising:

(1) a first gas reservoir containing gas under high pressure;

(2) a second reservoir containing gas at a lower pressure;

(3) an inter-reservoir conduit extending between the first and second reservoir for conveying gas there between;

(4) an inter-reservoir control valve in the conduit for permitting gas to flow from the first to the second reservoir under controlled conditions, including valve means within the control valve for closing-off the flow of gas therethrough in response to a valve signal;

(5) a throttling orifice in the conduit for limiting the rate of flow of gas through the conduit;

(6) a sensor positioned to provide a signal indicative of the pressure in the first reservoir; and (7) a controller connected to the sensor and the control valve, wherein the controller provides a valve signal to operate the control valve to limit gas flow through the conduit when the pressure in the first reservoir fails to drop according to a predetermined degree over time when the control valve is open.

10. A pressure relief system as in claim 9 wherein the first reservoir is a pressurized connecting line for refuelling a vehicle, said line being filled with gas under pressure, and the second, receiving reservoir is a blow-down tank of larger volume than the connecting line.

11. A system as in claim 10 wherein the throttling orifice is formed within a semi-precious jewel material.

12. A pressure relief system as in claim 10 wherein the controller, when delivered a signal by the sensor that is outside a predetermined pressure drop schedule, closes the inter-reservoir control valve, and the controller, after a time delay, reopens the inter-reservoir control valve.

13. System as in claim 12 wherein the throttling orifice is formed within a semi-precious jewel material.

14. A pressure relief system as in claim 10 comprising:

(1) a compressor connected to supply gas to the connecting line from a gas supply line that is connected to the compressor at an inlet on the compressor;

(2) a blow-down tank evacuation conduit connecting the inlet on the compressor to the blow-down tank and having a one-way valve mounted therein;

(3) an in-feed control valve in the supply line to isolate the supply line from the compressor while the gas in blow-down tank is being evacuated by the compressor, whereby, upon closing the in-feed and inter-reservoir control valves and operating the compressor, gas will be evacuated from the second reservoir.

15. System as in claim 14 wherein the throttling orifice is formed within a semi-precious jewel material.

16. A system as in claim 9 further comprising:

(1) a vehicle connection coupling positioned to allow gas to flow between the first reservoir and a vehicle tank;

(2) a buffer tank coupled to the first reservoir;

(3) a shut-off valve positioned between the first buffer tank and the vehicle coupling; and (4) a one-way valve positioned in the gas flow path between the buffer tank and the throttle orifice to prevent the flow of gas from the buffer tank through the throttle orifice.

17. System as in claim 16 wherein the throttling orifice is formed within a semi-precious jewel material.

18. System as in claim 9 wherein the throttling orifice is formed within a semi-precious jewel material.

* * * * *